Oct. 11, 1966  A. W. HÖWE  3,278,249
STORAGE CONTAINER AND ASSEMBLY INCORPORATING SAME
Filed Nov. 26, 1965  9 Sheets-Sheet 2

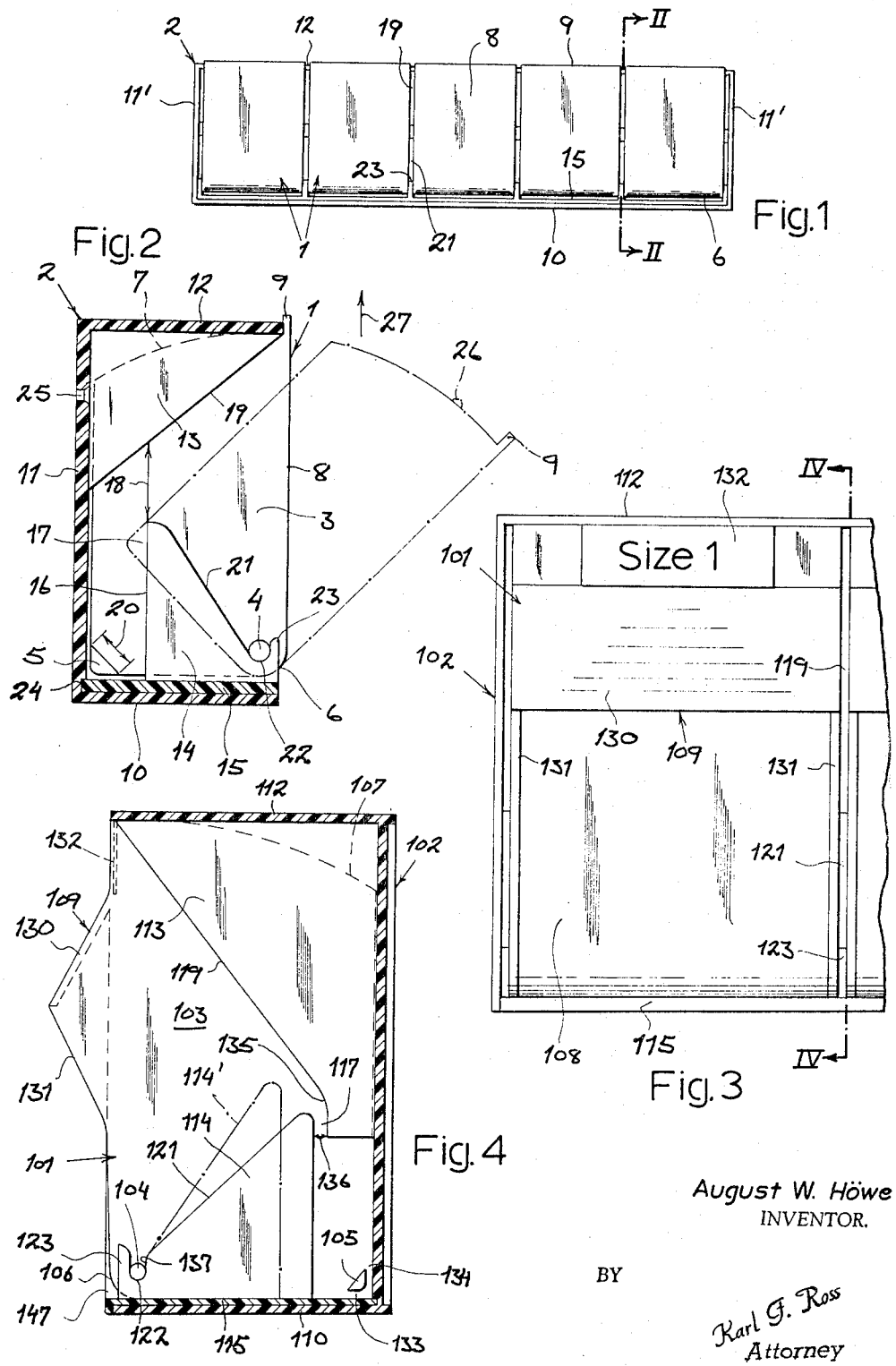

August W. Höwe
INVENTOR.

BY
Karl J. Ross
Attorney

Oct. 11, 1966 A. W. HÖWE 3,278,249
STORAGE CONTAINER AND ASSEMBLY INCORPORATING SAME
Filed Nov. 26, 1965 9 Sheets-Sheet 3
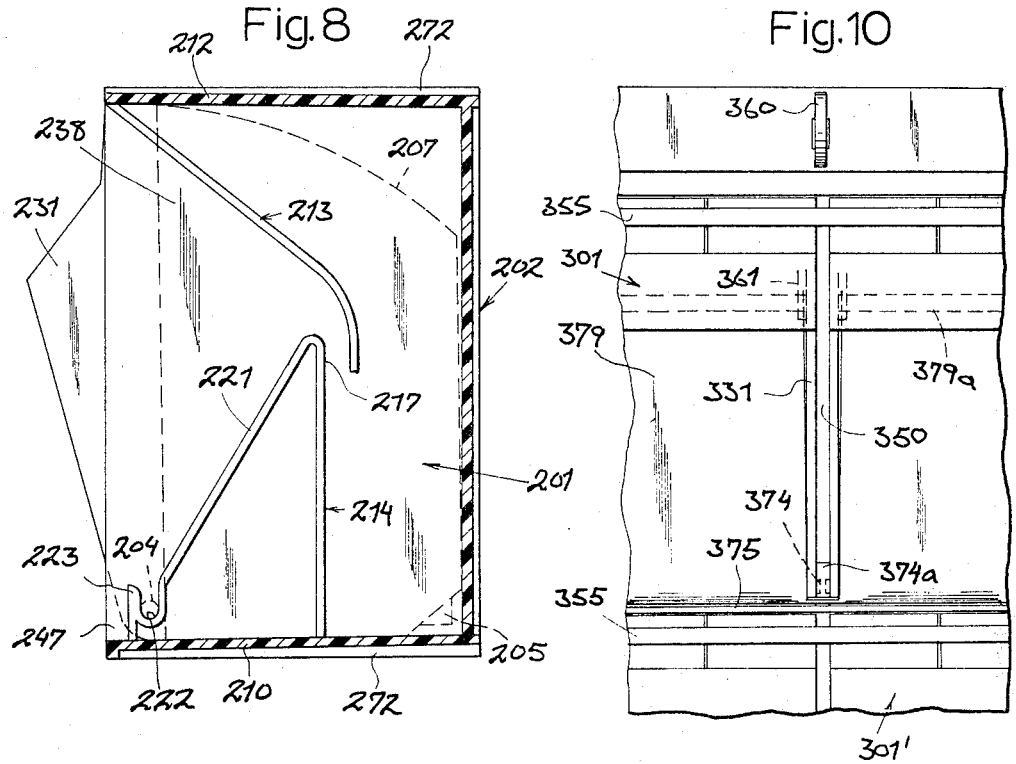
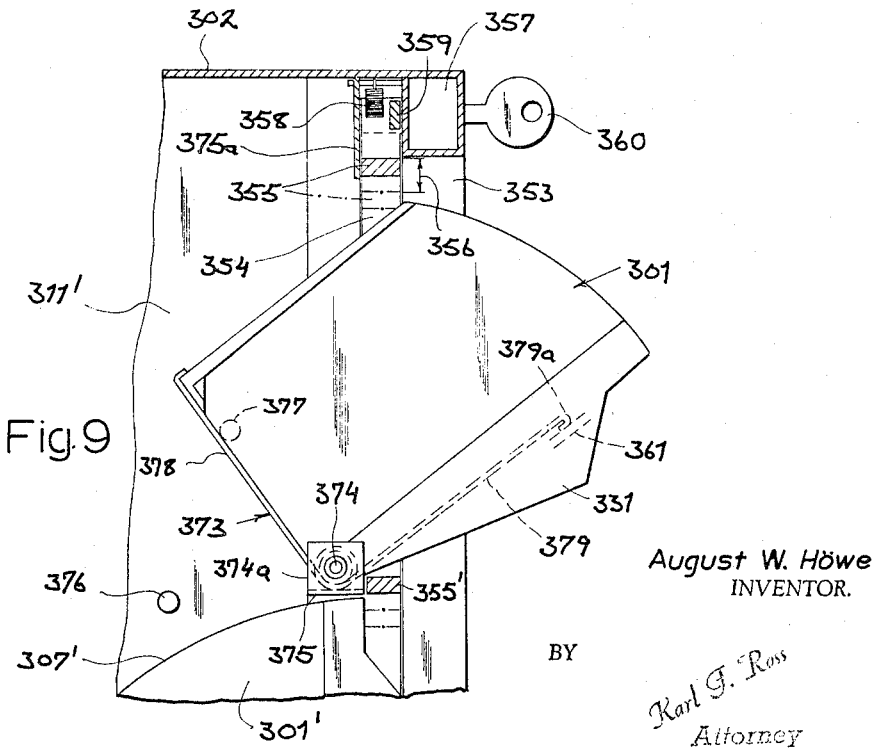
August W. Höwe
INVENTOR.
BY Karl G. Ross
Attorney Oct. 11, 1966    A. W. HÖWE    3,278,249
STORAGE CONTAINER AND ASSEMBLY INCORPORATING SAME
Filed Nov. 26, 1965    9 Sheets-Sheet 4
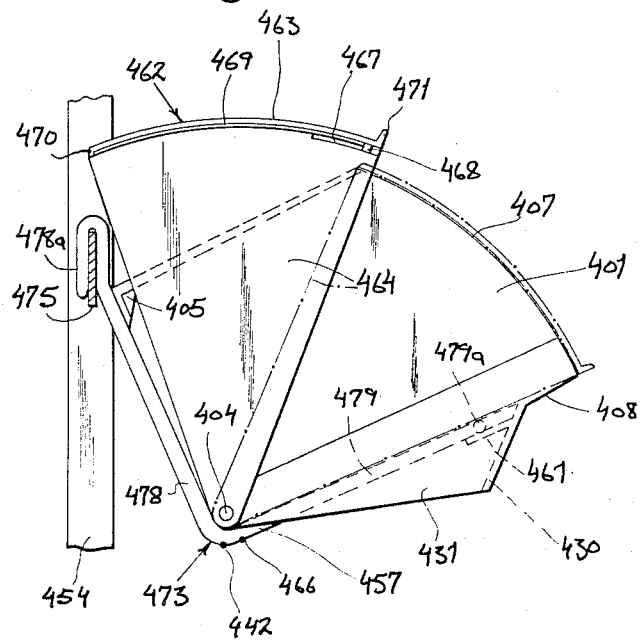
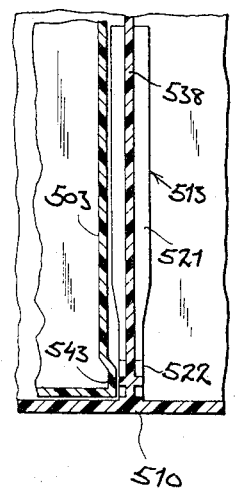
August W. Höwe
INVENTOR.
Karl J. Ross
Attorney Oct. 11, 1966 A. W. HÖWE 3,278,249
STORAGE CONTAINER AND ASSEMBLY INCORPORATING SAME
Filed Nov. 26, 1965 9 Sheets-Sheet 5
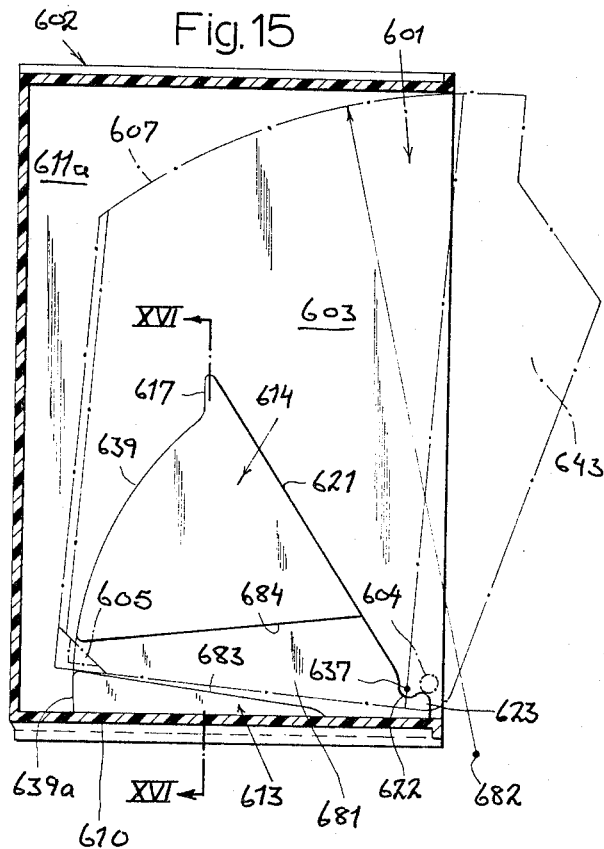
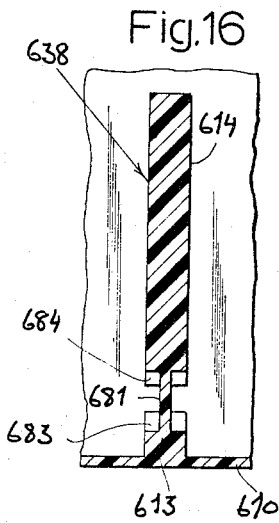
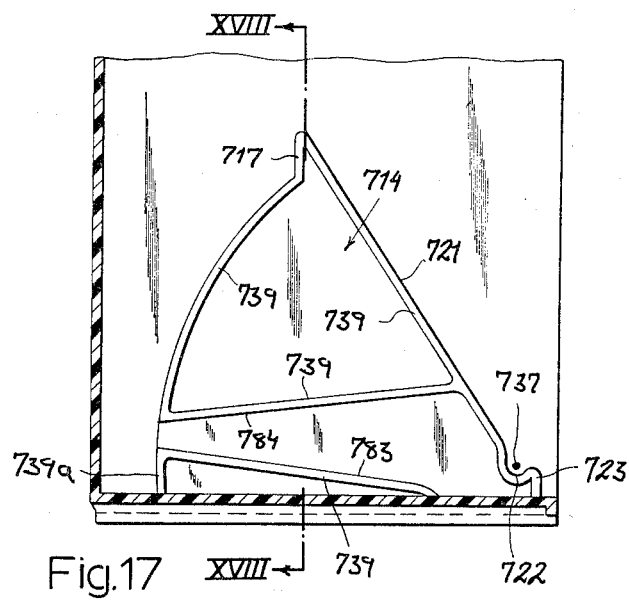
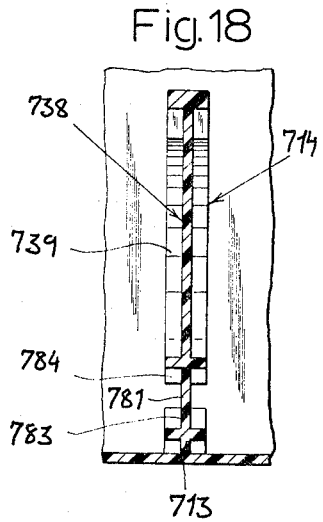
August W. Höwe
INVENTOR.
BY Karl F. Ross
Attorney Oct. 11, 1966    A. W. HÖWE    3,278,249
STORAGE CONTAINER AND ASSEMBLY INCORPORATING SAME
Filed Nov. 26, 1965    9 Sheets-Sheet 6
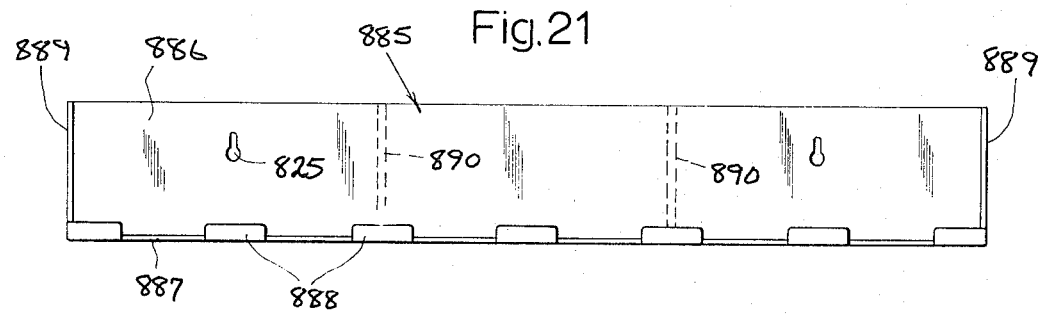
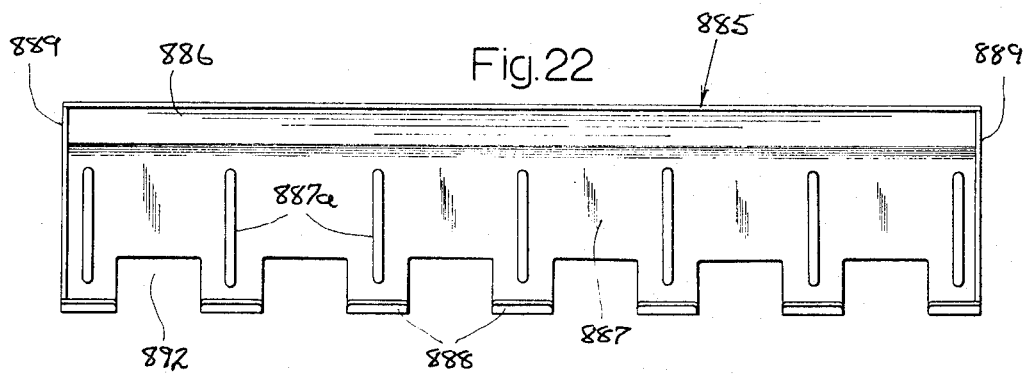
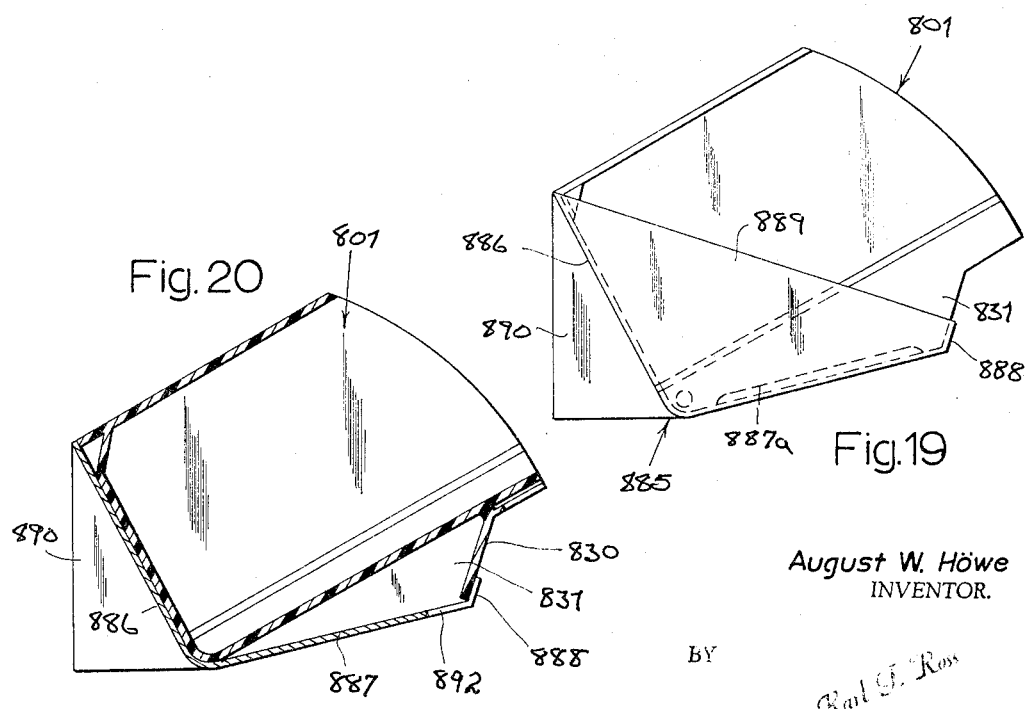
August W. Höwe
INVENTOR.
BY Karl F. Ross
Attorney Oct. 11, 1966　　　A. W. HÖWE　　　3,278,249
STORAGE CONTAINER AND ASSEMBLY INCORPORATING SAME
Filed Nov. 26, 1965　　　　　　　　　　　　　　　　9 Sheets-Sheet 8

August W. Höwe
INVENTOR.

BY Karl F. Ross
Attorney

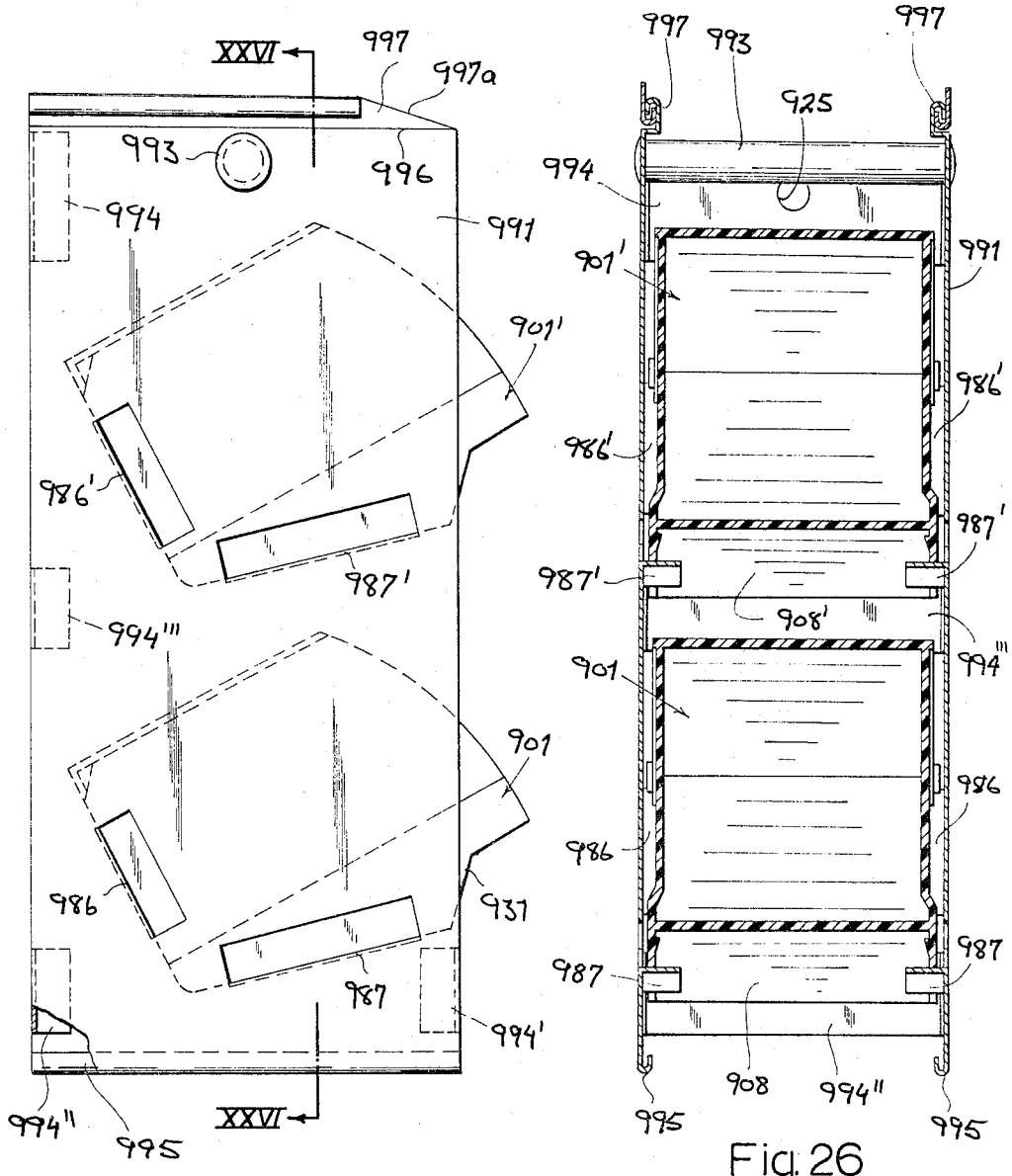

United States Patent Office 3,278,249
Patented Oct. 11, 1966

3,278,249
STORAGE CONTAINER AND ASSEMBLY
INCORPORATING SAME
August Wilhelm Höwe, Gottelmannstrasse 8,
Mainz, Germany
Filed Nov. 26, 1965, Ser. No. 509,978
30 Claims. (Cl. 312—328)

This application is a continuation-in-part of my co-pending application Ser. No. 233,202, filed October 24, 1962.

My present invention relates to storage containers serving, for example, as a repository for screws and other small articles of hardware, granular material, and similar bulk merchandise.

An object of this invention is to provide an open-topped container for such goods which can be conveniently tilted into a forwardly inclined attitude in which its open top is more readily accessible for the removal of part of its content, especially in an assembly in which several such containers are closely superposed so that access from above to a lower container could be impeded by an upper container, as is true of a conventional stack of drawers in a cabinet.

A more particular object of my invention is to provide a container of this description which can be easily and securely stacked with others of its kind without spillage of its contents and, if desired, while still maintaining accessibility to the goods stored therein.

It is also an object of this invention to provide an assembly in which one or more containers of the character set forth are movable relatively to a co-operating component, such as a lid or housing, for selectively covering and uncovering its open top.

In order to realize the aforestated objects, and others which will subsequently appear, I provide a container whose body has four walls rising substantially perpendicularly from its bottom, i.e. a front wall, a rear wall and two side walls, the latter walls having arcuate upper edges which extend from a horizontal top edge of the rear wall to a somewhat higher horizontal top edge of the front wall (as viewed when the container body is in its normal upright position), these arcuate edges being centered on a horizontal axis which is disposed close to the junction of the front wall with the container bottom. When this body is swung from its upright position about a fulcrum which is precisely or approximately in line with the aforementioned axis, in order to assume a forwardly inclined attitude, its overall height changes very little, if at all, so that the body will readily fit into a frame or opening throughout its swing range. This feature enables the container to be mounted in, for example, a forwardly open housing whose access opening is blocked by the container body in its retracted upright position, the open top of the container extending through this opening in a forwardly swung position. In order to be stabilized in its forwardly inclined attitude, the container is provided with positioning means which may take the form of lateral projections or lugs cooperating with suitable abutments in a surrounding housing.

According to a particularly advantageous feature of my invention, the positioning means may include a forwardly and upwardly sloping extension on the front wall of the container, this extension forming an auxiliary base on which the body may rest in its forwardly tilted position when separated from a housing or other support. It is, however, also possible to let this extension come to rest against an upwardly sloping supporting surface so as to increase the angle of elevation of the container. If this extension is designed as comprising a pair of side wings spaced sufficiently far apart to straddle the rear and side walls of an identical underlying container, any reasonable number of such containers may be stacked in the same tilted position with the lowermost container resting on the ground and the other container bearing each upon the next-lower one. The container bodies are preferably provided with interlocking formations for maintaining them in positive engagement to prevent a collapse of the stack.

In accordance with a further feature of this invention, the container body is provided at or near the axis of curvature of its arcuate edges with a pair of aligned hinge pins receivable in bearing cradles of an associated housing compartment from which the container may be removed by forward sliding through the aforedescribed access opening after the pins have been lifted out of their bearings. In the normal operation of the assembly, the container is either tilted outwardly to give access to its contents or swung back into a retracted position within the housing in which the upper boundary of the access opening lies close above the top edge of the container front wall so as to protect the goods frm dust and/or light; if the front wall of the container is somewhat set back behind this opening, a locking member may be moved into position to secure the container against unintentional or unauthorized uncovering of its contents. When, however, the container has been removed from the housing, it may be conveniently transported to, say, a work station where its contents are needed together with those of other, similar containers which may thus be stacked in the aforedescribed manner at the site of their temporary residence. Auxiliary receptacles or holders may also be provided at such site for supporting the containers in their inclined position of ready accessibility.

Advantageously, in conformity with still another feature of my invention, the container body is so designed that its center of gravity lies forwardly of its swing axis in its limiting forwardly tilted position, i.e. a position wherein the normally higher top edge of the front wall extends below the level of the top edge of the rear wall, but lies rearwardly of that axis in the normal upright position whereby the container is tipped under its own weight into one or the other position upon being swung past a dead-center position. The forwardly projecting extension of the front wall may be conveniently designed as a hand grip by which the container body may be swung in and out or completely withdrawn from the housing.

The above and other features and advantages of my invention will become more fully apparent from the following detailed description, reference being made to the accompanying drawing in which:

FIG. 1 is a front-elevational view of a multicontainer unit embodying the invention;

FIG. 2 is a cross-sectional view taken on the line II—II of FIG. 1;

FIG. 3 is a fragmentary front-elevational view of a modified unit embodying the invention;

FIG. 4 is a cross-sectional view taken on the line IV—IV of FIG. 3;

FIG. 8 is a cross-sectional view of a housing, similar to that of FIGS. 1–4, accommodating a container of the type shown in FIGS. 5–7;

FIG. 9 is a fragmentary cross-sectional view of a housing and several containers representing another embodiment of the invention;

FIG. 10 is a partial front view of the assembly shown in FIG. 9;

FIG. 11 is a side-elevational view of still another container according to the invention together with a lid therefor;

FIG. 12 is a view generally similar to FIG. 2, illustrating a further embodiment;

FIGS. 13 and 14 are cross-sectional views taken on lines XIII—XIII and XIV—XIV, respectively, of FIG. 12;

FIG. 15 is a view similar to FIG. 12, showing a modification;

FIG. 16 is a cross-sectional view taken on the line XVI—XVI of FIG. 15;

FIG. 17 is a fragmentary view again similar to FIG. 12, illustrating a further modification;

FIG. 18 is a cross-sectional view taken on the line XVIII—XVIII of FIG. 17;

FIGS. 19 and 20 are a side-elevational view and a corresponding sectional view of a container, similar to that shown in FIGS. 5–7, together with a receptacle therefor;

FIGS. 21 and 22 are a front-elevational view and a top plan view of the receptacle shown in FIGS. 19 and 20, with the containers removed;

FIG. 25 is a view similar to FIG. 23, showing a modified assembly; and

FIG. 26 is a sectional view taken on the line XXVI—XXVI of FIG. 25.

Figure 5:
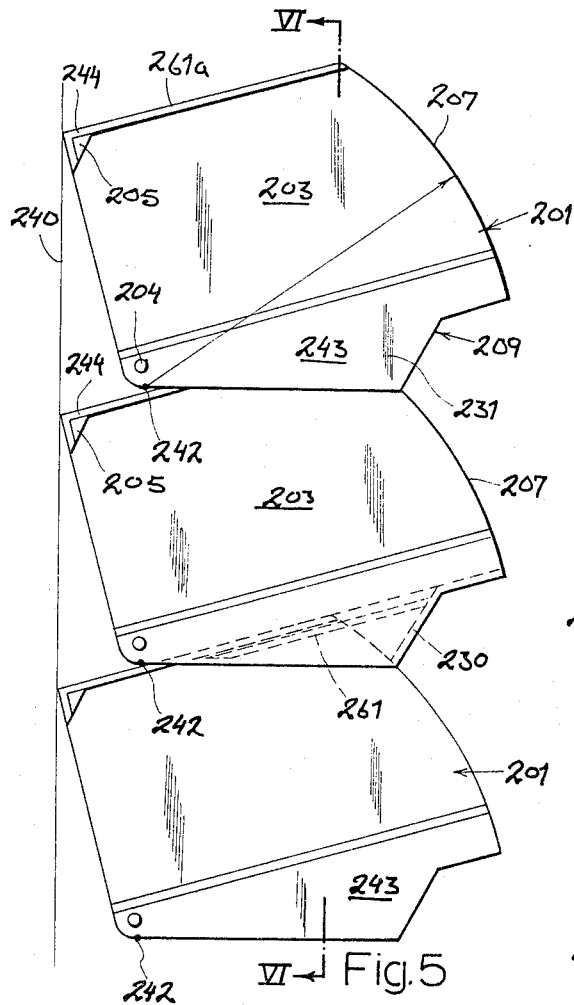
FIG. 5 is a side-elevational view of a stack of containers generally similar to those shown in the preceding figures.

The assembly shown in FIGS. 1 and 2 comprises a plurality of juxtaposed containers 1 and a frame-type housing 2, the containers 1 being supported tiltably and removably in the housing 2.

Each side wall 3 of any container 1 is provided, at its lower front corner, with a hinge pin 4. In addition, at least one side wall 3 of each container 1 carries at its lower rear corner a lug or stop dog 5 which is shown to have a triangular profile. In this embodiment, the supporting and positioning elements 4 and 5 are integrally molded with the side walls 3.

In addition, the lower front edge of the container 1 is rounded at 6 to permit tilting movement. Further, the upper edge 7 of each side walls 3 is a circular arc centered on the hinge pins 4 which define the swing axis for the tilting movement.

The container 1 can be made from transparent plastic material by injection molding. The contents of the container 1 can therefore be readily ascertained from without. To facilitate operation, the front wall 8 of the container can terminate at its upper part in a handle 9, projecting beyond the housing 2. In the embodiment of FIGS. 1 and 2, the handle 9 extends vertically, but for stacking several such boxes it is more advantageous to provide a downwardly and outwardly sloping handle as illustrated in succeeding figures.

The housing 2 is integrally constructed from plastic material with a floor 10, a rear wall 11, side walls 11' and a top 12. It further includes, integrally with the rear wall 11 and the top 12, a set of triangular guide plates 13 serving as partitions between adjacent container compartments. The plates 13 also act as internal reinforcements which, when several storage units according to the invention are stacked, prevent the housing top 12 from buckling in its front part.

For supporting and retaining the containers 1, each compartment of the housing is flanked by a pair of substantially triangular bearing and stop plates 14 which are vertically arranged between the individual containers 1 and are integrally formed with a common base plate 15. FIG. 1 shows that the thickness of these bearing and stop plates 14 is such that the outer surfaces of the side walls 3 of the containers 1 come into contact with these plates and are thus laterally guided. Further, the triangular guide plates 13 are so disposed in the housing that, as FIG. 1 shows, they are coplanar with the plates 14. Advantageously, the thickness of the plates 13 is the same as that of the plates 14, so that the containers 1 are also laterally guided, at the upper parts of their side walls 3, by the plates 13.

The rear edge 16 of each bearing and stop plate 14 extends substantially vertically and forms, in its upper region, an abutment 17 for the respective lug 5 to limit its forward swing; the attitude of the container 1 in its swung-out position has been illustrated in dot-dash lines. The distance 18 between the sloping front edge 19 of the triangular guide plate 13 and the upper end of the bearing and stop plate 14 is greater than the diagonal width 20 of the lug 5.

The front edge 21 of the plate 14 slopes forward and downward and passes into a bearing cradle 22 for the pin 4. The bearing cradle 22 terminates at its front in an upstanding finger 23 which prevents unintentional slipping of the pin 4 from the cradle 22.

To help secure the plates 14 to the base plate 15, the rear wall 11 of the housing 2 is provided, in its lower part, with an undercut 24 engaged by the base plate 15. This also insures exact alignment of the base plate 15 with the floor 10 of the housing 2.

The rear wall 11 of the housing can also be provided with holes 25 for attaching the housing to a wall or other support. Thus, a stack of storage units according to the invention can be reinforced by a framework to which the rear walls 11 of the individual compartments are bolted through the holes 25.

All this is required to expose the open top of a container is to pull at the handle 9. When a certain angle of inclination is exceeded, the container 1 spontaneously continues to tilt forward until its lug 5 comes to rest against the abutment 17. This insures that the container 1 is steadied in its open position. All that is required to close the container 1 is to push its front wall 8 inward until the dead-center position has been passed whereupon the container 1 swings back into its normal upright position of closure under its own weight.

To secure the container 1 in its closed position, interfitting formations may be provided such as, for example, a small projection 26 on the side wall 3 which runs in a groove provided on the underside of the housing top 12.

To remove the container 1 from the housing 2 it is merely necessary to swing it into the open position indicated by dot-dash lines in FIG. 2 and to raise it, according to the arrow 27, until the lug 5 clears the top edge of the bearing and stop plate 14. The container 1 can then be withdrawn through the front opening of the housing 2.

To insert the container 1 into the housing 2 it is placed in an inclined position, with its lugs 5 bearing from below against the guide edges 19 of the plates 3, and pushed back into the housing 1 until the pins 4 come to lie on the inclined front edges 21 of the plates 14 while the lugs 5 engage the inner surface of the rear wall 11 of the housing. All that is then required is to swing the container 1 into its vertical position. The pins 4 slide on the edges 21 into the bearing cradles 22. The container 1 will then have reached its operative position and can be opened or closed as described above.

Reference will now be made to FIGS. 3 and 4 which show a storage unit generally similar to that of FIGS. 1 and 2, analogous elements having been designated by the same reference numerals preceded by a "1" in the position of the hundreds digit. The same mode of identification, using different hundreds digits, is adopted for succeeding embodiments described below. The individual elements so designated will not be specifically referred to unless they differ markedly from their counterparts in preceding figures.

Each of the containers 101 forming part of the unit shown in FIGS. 3 and 4 has a modified front wall 108 with a handle-forming extension 109 projecting forwardly through the access opening of housing 102. Extension 109 serves as an auxiliary base on which the container may rest in an inclined position upon being removed from the housing. This extension comprises a pair of side wings 131 which are flush with the corresponding side walls 103 and are bridged at the top by a connecting strip 130 constituting a hand grip by which the container may be pulled forward to swing about the axis of pins 122. A label 132 is shown attached to the inside of the transparent front wall 108 so as to be visible through the top portion thereof.

The lugs 105 are here shown to be disposed slightly inwardly of the bottom and rear edges of the side walls 103 with which they define contact surfaces 133 and 134 adapted to engage confronting guide surfaces on the lateral housing plates 113, 114 upon an outward swing of the container. The sloping guide edge 119 of plate 113 terminates for this purpose in an arcuate bottom portion 135 spaced from the abutment edge 117 of plate 114 by a distance 136 sufficient to clear the lug 105. As indicated in FIG. 4, plate 114 may be replaced (together with its base 115) by a somewhat modified plate 114′ to change the limiting swung-out position of the container 101 in which the lug 105 abuts the vertical rear edge of such plate.

For the purpose of inserting the container 101 into the housing 102 it is merely necessary to place the container in a forwardly inclined position in which its pins 104 bear upon the front edges of guide fingers 123 while its lugs 105 rest on the upper reaches of sloping edges 121; upon a slight raising of the pins 104, sufficient to clear the fingers 123, the lugs 105 will ride up the edges 121 until they strike the curved edges 135 and are guided downwardly along rear edges 117 of plate 114 or 114′.

The rounded lower front edges 106 of the container body is slightly set back at 147 from the plane of the access opening of housing 102. The resulting slight inclination of the lower part of front wall 108 with reference to the vertical in the closed position (FIG. 4) insures that the container, upon being tilted forwardly to the limit of its swing range, rests with that sloping edge against the upper surface of base 115 so as to relieve the strain upon the hinge pins 104 when the container is filled with relatively heavy articles. It should be noted that the upwardly open recess defined by the bearing cradle 122 is somewhat deeper than in the preceding embodiment to define an upstanding edge 137 which absorbs any rearward thrust exerted upon the pins 104.

Figure 6:
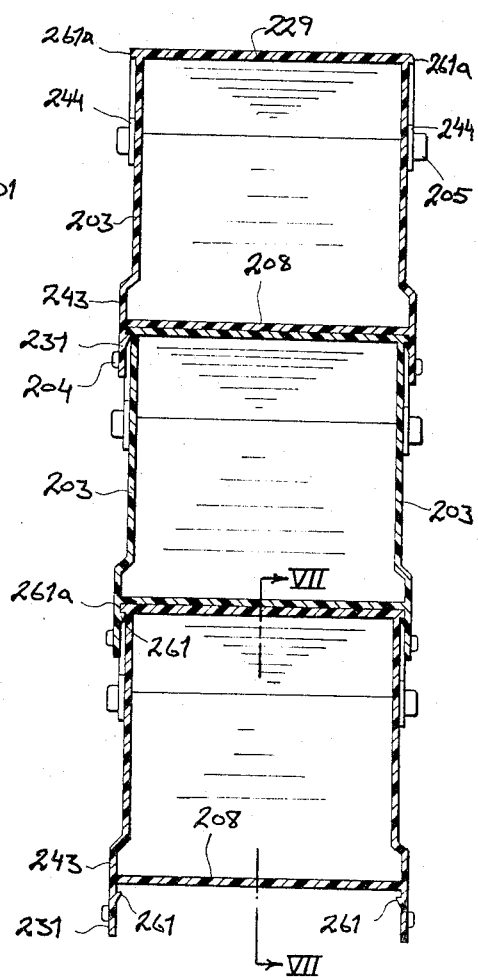
FIG. 6 is a cross-sectional view taken on the line VI—VI of FIG. 5.
Figure 7:
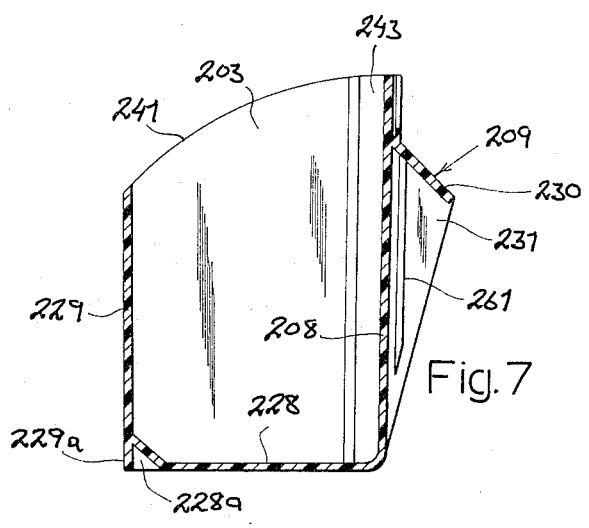
FIG. 7 is a cross-sectional view taken on the line VII—VII of FIG. 6.

In FIGS. 5–7 I have illustrated the manner in which a plurality of containers 201 may be stacked in interlocking fashion when withdrawn from their respective housing compartments. To this end, the forward extension 209 of each container is modified so that its wings 231 are coplanar extensions of laterally offset forward portions 243 of the side walls 203 of which they form integral forward portions. The mutual separation of the wings 231 is slightly greater than the width of the rear wall 229 of the container so that these wings straddle the rear and side walls of an underlying container when several containers are vertically stacked. In this stacked position, the bridge strip or apron 230 of an upper container bears upon the arcuate upper edges 207 of the side walls 203 of the next-lower container, thereby positively maintaining the containers in a position of relative alignment in which their raised rear bottom edges all lie in a common vertical plane 240. For even more positive interengagement, the rear wall 229 of each container terminates in a pair of lateral ribs 261a which project beyond the side walls 203 and slidingly fit into grooves formed between the front wall 208 of the next-higher container and a rib 261 extending parallel thereto on each wing 231 (see particularly FIG. 7).

Whereas in the embodiment of FIGS. 1–4 the arcuate upper edges 7, 107 of the container side walls were centered on the swing axis defined by the hinge pins 4 and 104, thereby maintaining continuous contact between these curved edges and the housing top 12 or 112 throughout the swing range, I have indicated in FIG. 5 that the edges 207 may be centered on an axis 242 disposed a little to the front of the fulcrum 204 of each container. This has the effect that the edge 207 drops slightly away from the housing top as the container is swung outwardly, thereby reducing the frictional resistance to the opening and closing movements. The lugs 205 of each container 201 are framed on two sides by extensions 244 of ribs 261a and project laterally beyond the offset wall portions 243 which rest flat against the surfaces of inner housing walls or partitions 238 (FIG. 8) defining the respective container departments. In the housing 202 shown in FIG. 8, the walls or partitions 238 are formed with integral ribs 213 and 214 of which the former defines a guide surface for lug 205 while the latter forms an abutment 217 for that lug and a supporting surface and bearing cradle 222 for the pin 204 of an adjacent container wall.

As further illustrated in FIG. 7, the container bottom 228 is upwardly slanted near its junction with rear wall 229 to form a heel 229a alongside a groove 228a adapted to accommodate the fingers of one hand when the apron 230 is gripped with the other hand for easy transportation of the container.

In FIGS. 9 and 10 I have shown a plurality of containers 301 which are generally similar to those of FIGS. 5–8 and are mounted in a row within a housing 302, together with other containers 301′ of identical construction forming a second lower row. The containers 301, 301′ are normally, i.e. when in their retracted upright position, set back from the access opening 353 of housing 302 so that locking bars 355, 355′ can be lowered in front of their upper forward faces to prevent an outward swing of any container of a particular row. The containers of each row are mounted on a common rocker 373 which is pivoted to the housing 302, e.g. a steel cabinet, by pins 374 journaled in brackets 374a. The brackets 374a, in turn, are carried on rails 375 that span the end walls 311′ of the housing. Fixed stops 376, 377 on these end walls limit the swing of the rocker 373 by co-operating with its continuous rear arm 378 on which the bottom of each container is seated. A front arm 379 of the rocker is subdivided by transverse slots 350 into individual sections 381 each coextensive in width with a respective container 301. The slots 350 accommodate the forwardly projecting wings 331 of respective pairs of adjoining containers. The sections 381 of rocker arm 379 are bent over to form beads 379a which bear upon the ribs 361 of the wings 331 to stabilize the containers on the rocker. It will be noted that rail 375 immediately overlies the upper edges 307′ of the containers 301′ in their retracted positions while the lower edge of another rail 375a similarly coacts with the edges 307 of containers 301.

The locking bars 355, 355′ may be jointly or individually set by a conventional mechanism here represented by a pair of vertical side bars 384 (only one shown) which are slidably disposed along the housing walls 311′ and are rigid with the bars 355, 355′. Springs 358 bias the locking frame 354, 355, 355′ into an upwardly retracted position from which it may be moved downwardly, by a distance 366, with the aid of a latch member 359 of a lock 357 controlled by a key 360.

FIG. 11 shows an assembly of a container 401 with a lid 462 adapted to cover its open top in a dustproof manner. The lid 462 has side portions 464 swingable about the hinge pins 404 of the container and also has an arcuate cover portion 463 integral therewith, this cover portion being centered on an axis 466 which is slightly offset from the center line of the pins 404 and from the axis of curvature 442 of container edges 407. As a result of this arrangement, the cover portion 463 is lifted off the top of container 401 on being swung backwards from its closure position (dot-dash lines) into its retracted position (full lines) in which the interior of container 401 is accessible.

FIG. 11 also shows the container and its lid supported by a bracket 473 which is generally similar to the rocker 373 of FIG. 9 and has a pair of arms 378, 379, the latter terminating in a bead 479a which is straddled by the front wall 408 of the container and the ribs 461 of its wings 431. Arm 478 has a looped rearward extension 478a by which it is removably suspended from a crossbeam 475 on a mounting frame 454.

The underside of cover portion 463 has a pocket 467 designed to carry a label, e.g. as shown at 132 in FIG. 3. This pocket has a forward edge 468 serving as an end stop upon striking the rear face of the front wall of container 1. The upper end 470 of cover portion 463 and its sides 469 are bent downwardly to form depending flanges which securely shield the interior of container 401 against dust in the closed position of the lid 462. A tip 471 facilitates the swinging of the lid with reference to the container.

In FIGS. 12–14 I have illustrated a modified housing 502 designed to simplify the insertion and removal of a container 501; in FIG. 12 this container has been illustrated, in dot-dash lines, in a position of incomplete insertion. The center of curvature of upper edges 507 has been moved forwardly, with reference to the hinge pins 504, to a point 582 so that these edges drop off more sharply toward the rear and permit a slight lifting of the container after the latter has been tilted forwardly by a small angle from its detracted upright position. The bearing cradles 522 have been made considerably shallower than in preceding embodiments, the front edge 523 of their trough rising only to the level of their horizontal axis 537. At this level there is also provided a gap between two guide formations 513, 514 which in this case are shown formed as integral ribs of a partition 538, similar to the arrangement of FIG. 8. Rib 513 is continuous with cradle 522 and has a rearwardly and upwardly sloping portion 521 including an acute angle with an abutment surface 517 for the lug 505; an arcuate, rearwardly convex guide surface 539 for the lug 505, this guide surface being centered on the hinge axis 537; and a portion 584 defining with a confronting portion 583 of rib 514 a forwardly diverging gap 581 through which the lug 505 may be substantially horizontally extracted, the rib 514 also having a portion 539a constituting an extension of guide surface 539 beyond this gap. As seen in FIG. 13, the rib portions 521 on opposite sides of partition 538 are reduced in the region of cradle 522 so that the respective lugs 505, which are coplanar with offset portions 543, may clear them; see also FIG. 14. The rearwardly converging shape of the gaps 581 minimizes the risk of accidental dislodgement of the container 501 upon a tilting thereof into a position in which its lugs 505 are aligned with these gaps.

FIGS. 15 and 16 show a similar arrangement wherein, however, the rib-carrying partition 538 has been replaced by a plate structure 638 which comprises the guide formations 613, 614 and terminates at the upper boundaries 621, 639, 617 of formation 614. According to a modification shown in FIGS. 17 and 18, a plate structure 738 of the same outline as structure 638 has a thin central web from which the guide formations 713 and 714 project again in the form of integral ribs.

In FIGS 19–22 I have shown a receptacle 885 in which several containers 801, each similar to those shown in FIG. 5 and succeeding figures, can be removably cradled in a forwardly tilted position. Receptacle 885 has two arms 886 and 887 which, in contradistinction to those of the rocker 273 (FIG. 9) and the bracket 473 (FIG. 11), include an obtuse angle with each other. The front arm 887 is formed with large incisions 892 through which the user can reach with his fingers to grasp the apron 830 of a respective container which is held in position by upstanding ledges 888 on the forwardly projecting portions of this arm. The individual containers are separated from each other by upstanding parallel ribs 887a of arm 887. Arms 886 and 887 are spanned by generally triangular end walls 889. The rear arm 886 may be provided with slots 825 to facilitate its suspension from an external support. Several rear fins 890, also of triangular shape, help stabilize the loaded receptacle against the ground.

Figure 23:
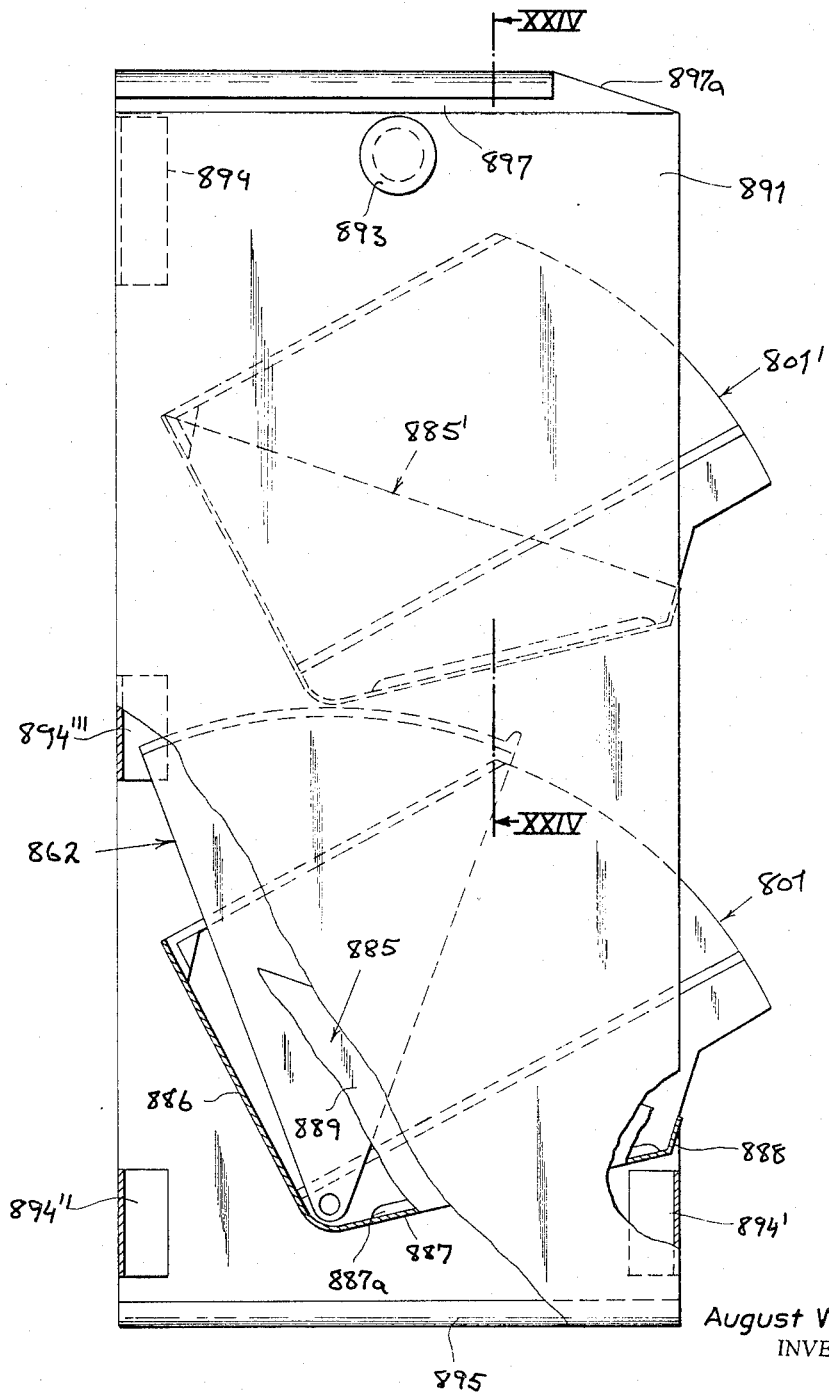
FIG. 23 shows an assembly of two multicontainer receptacles, as illustrated in FIGS. 19–22, in a common mounting therefor.
Figure 24:
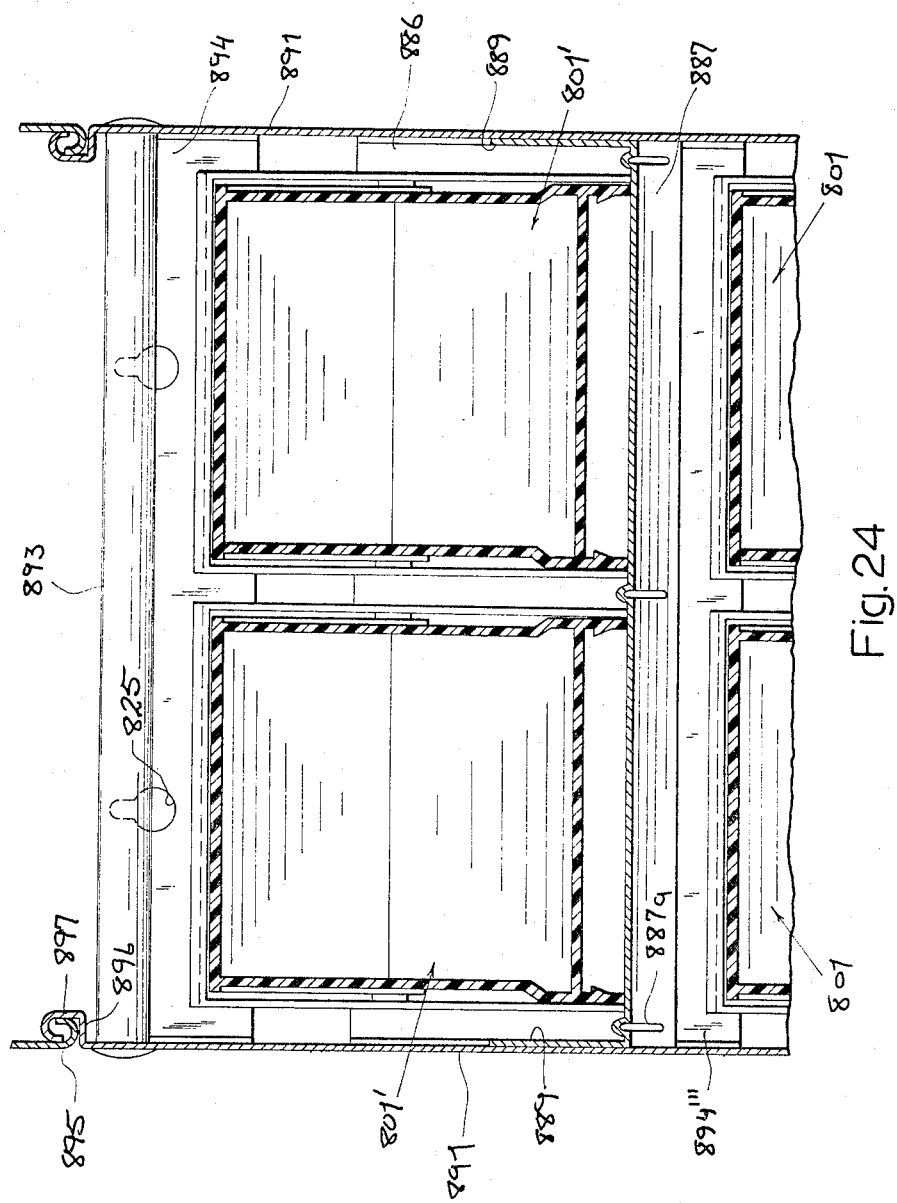
FIG. 24 is a fragmentary sectional view taken on the line XXIV—XXIV of FIG. 23.

As illustrated in FIGS. 23 and 24, several receptacles 885, 885′ may be combined with a pair of standards 891 to form a rack for two or more rows of containers 801, 801′. The receptacles 885, 885′ and the standards 891 may be made of sheet metal and may be spot-welded to each other along the side walls 889 of the receptacles. A preferably tubular rod 893 bridges the standards 891 to form a brace for the rack above the upper row of containers 801′; in addition, other bracing bars may be provided as indicated at 894, 894′, 894″ and 894‴. It will be noted that the vertical separation of the receptacles 885, 885′ is so chosen that a cover 862 of the type described in connection with FIG. 11, has just enough room to swing past.

As best seen in FIG. 24, the upper edge of each standard 891 forms an inwardly directed flange 896 which is bent upwardly and outwardly to define an outurned lip 897 complementary to an inturned lip 895 extending along the bottom edge of the standard; thus, several such standards may be superposed and matingly interlocked as indicated at the top of FIG. 24. The front of flange portion 897 is beveled at 897a (FIG. 23) to simplify the interengagement of the tongue-and-groove formations 895, 897 of a pair of superposed standards.

Naturally, a receptacle of the type shown at 885 in FIGS. 19–24 could also be used as a rocker in an assembly of the type shown in FIGS. 9 and 10, or as a suspended bracket in the manner illustrated in FIG. 11.

Finally, I have shown in FIGS. 25 and 26 a rack which is generally similar to that of FIGS. 23 and 24 but accommodates only two vertically spaced containers 901, 901′. The standards 991 of this rack, again formed with interfitting beads 995, 997 at their lower and upper edges, carry brackets 986, 987 and 986′, 987′ for the support of containers 901 and 901′, the brackets of each pair again including an obtuse angle with each other to engage, respectively, the bottom end of the container and its side wings 931 or 931′. The spacing of the standards 991 from each other should be sufficient to allow the user to reach with his hand between the front brackets 987 or 987′ for the purpose of grasping the hand grip of a container and sliding it out of the rack. In this case, too, sufficient clearance should be provided to accommodate a swingable lid as described in connected with the preceding embodiment.

It will be apparent that my invention admits of many modifications and that compatible features disclosed in connection with different embodiments may be combined without departing from the spirit and scope of the appended claims.

I claim:

1. A container comprising an upwardly open body with a front wall, a rear wall, two side walls and a bottom interconnecting said walls, said walls rising substantially perpendicularly from said bottom, said front and rear walls having substantially straight top edges remote from said bottom, the top edge of said front wall being normally disposed above that of said rear wall, said side walls having upper edges extending from the top edge of said rear wall to the top edge of said front wall along arcuate lines centered on a horizontal axis disposed close to the junction of said front wall with said bottom, and positioning means on said body for stabilizing it in a forwardly inclined attitude in which the top edge of said rear wall lies forwardly of said axis and above the top edge of said front wall whereby the open top of said body becomes accessible from the front, the arcuate shape of said upper edges maintaining a substantially constant overall height for said body upon a swing thereof about a fulcrum substantially in line with said axis toward said forwardly inclined attitude from an upright normal position.

2. A container as defined in claim 1 wherein said positioning means comprises a forwardly and upwardly sloping extension on said front wall forming an auxiliary base for said body in a tilted position thereof.

3. A container as defined in claim 2 wherein said extension includes a pair of side wings laterally offset from said side walls with a mutual separation greater than the width of said rear wall whereby said wings in said tilted position can straddle the rear and side walls of an identical underlying container in a stack of a plurality of such containers.

4. A container as defined in claim 3 wherein said wings and said side walls are provided with mutually complementary elongated upwardly extending formations enabling positive interfitting of several stacked containers.

5. A container as defined in claim 3 wherein said extension further comprises a connecting element bridging the upper ends of said wings and forming a hand grip for said body, said element coming to rest against the arcuate upper edges of said underlying container upon a stacking thereof.

6. A container as defined in claim 1 wherein said body is provided with pivot means substantially in line with said axis for swingably supporting said body on a holder therefor.

7. In combination, a container as defined in claim 1 and a co-operating component movable relatively thereto for selectively covering and uncovering the open top of said body, said component having side members pivotally engaging said body in the vicinity of said axis.

8. The combination defined in claim 7 wherein said component comprises a curved lid registering with said top and upper edges in a position of closure.

9. The combination defined in claim 8 wherein said component is hingedly connected with said body at a fulcrum spaced slightly rearwardly from said axis whereby said lid lifts off said upper edges upon a rearward swing from said position of closure.

10. The combination defined in claim 7 wherein said component is a stationary upright housing with a forward opening in line with said container, said body being hingedly connected with said housing at a fulcrum substantially in line with said axis for enabling a forward swing of said body through said opening into a position of accessibility of said open top from outside said housing.

11. The combination defined in claim 10 wherein said opening has an upper boundary lying closely above the top edge of said front wall in said upright normal position of the container, thereby substantially sealing said open top against the outside.

12. The combination defined in claim 11 wherein said front wall substantially completely occupies said opening in said upright normal position.

13. The combination defined in claim 12 wherein said front wall is provided with forwardly projecting handle means extending through said opening for allowing said container to be pulled forwardly.

14. The combination defined in claim 11 wherein said body is provided with a pair of hinge pins extending laterally outwardly in opposite directions from said side walls, said housing having lateral supporting surfaces with upwardly open recesses matingly receiving said pins for defining therewith said fulcrum while enabling said pins to be lifted out of said recesses, thereby releasing said body from said housing for permitting extraction of said container through said opening.

15. The combination defined in claim 14 wherein said positioning means includes a laterally projecting lug on at least one side wall rearwardly of said pins, said housing being provided with an internal abutment engageable by said lug in a limiting forwardly swung position of said body.

16. The combination defined in claim 15 wherein said lug has a diagonal forward edge coming to rest against a substantially vertical rear edge of said abutment in said limiting position.

17. The combination defined in claim 15 wherein each side wall has a lug co-operating with a respective internal abutment, said housing being provided with a pair of lateral guide surfaces engageable with said lugs upon displacement of said container.

18. The combination defined in claim 17 wherein said guide surfaces are upwardly and forwardly inclined and extend spacedly above said abutments for contact with said lugs upon a withdrawal of said container through said opening.

19. The combination defined in claim 17 wherein said supporting surfaces, abutments and guide surfaces are integral formations on a pair of lateral housing walls.

20. The combination defined in claim 17 wherein said guide surfaces are of rearwardly convex arcuate shape centered on said pins and are engageable by said lugs upon a forward swing of said body, said abutments forming terminal portions of said guide surfaces.

21. The combination defined in claim 20 wherein said abutments are disposed sufficiently rearwardly to prevent a withdrawal of said container from said housing by a swinging motion about said pins, said guide surfaces each having a gap substantially one the level of said recesses traversable by the respective lug in a slightly raised position thereof for facilitating such withdrawal upon a disengagement of said pins from said recesses.

22. The combination defined in claim 17 wherein said side walls have laterally outwardly offset forward portions projecting beyond said front wall through said opening with a mutual separation greater than the width of said rear wall for defining a pair of wings adapted to straddle a rear portion of an identical container, said pins being disposed on said offset portions, the latter fitting closely between said supporting surfaces.

23. The combination defined in claim 22 wherein said lugs are substantially coplanar with said offset portions.

24. The combination defined in claim 15 wherein said body has a center of gravity disposed forwardly of said pins in said limiting position and rearwardly of said pins in said upright position, thereby stabilizing said container in either of said postions.

25. The combination defined in claim 10, further including a rocker pivotally mounted in said housing for swinging about said fulcrum, said rocker having a first arm supporting said bottom and a second arm positively engaging said front wall.

26. The combination defined in claim 10 wherein said housing is provided with locking means selectively positionable forwardly of said front wall in said opening.

27. In combination, a container as defined in claim 1 and a temporary receptacle therefor, said receptacle including two side members flanking said body, a rearwardly and upwardly inclined first supporting surface for said bottom wall and a forwardly and upwardly inclined second supporting surface for said front wall, said container being upwardly and forwardly withdrawable from said receptacle.

28. The combination defined in claim 27 wherein said supporting surfaces include an obtuse angle with each other, said body being provided with a projection extending forwardly from said front wall into contact with said second supporting surface.

29. The combination defined in claim 28 wherein said second supporting surface terminates in an upstanding front ledge engaging said projection, said container being withdrawable from said receptacle only upon a raising of the top portion of its front wall sufficient to lift said projection above said ledge.

30. The combination defined in claim 27 wherein said side members project upwardly and downwardly beyond said container and are provided with lower and upper edges having horizontally extending complementary tongue-and-groove formations for permitting the interfitting of said receptacle with identical receptacles in a stack thereof.

References Cited by the Examiner
UNITED STATES PATENTS

| | | | |
|---|---|---|---|
| 163,126 | 5/1875 | Whiteside et al. | 312—327 X |
| 2,977,175 | 3/1961 | Bonomo | 312—328 |

FOREIGN PATENTS

| | | |
|---|---|---|
| 1,032,836 | 4/1953 | France. |

CLAUDE A. LE ROY, *Primary Examiner.*

F. DOMOTOR, *Assistant Examiner.*